UNITED STATES PATENT OFFICE.

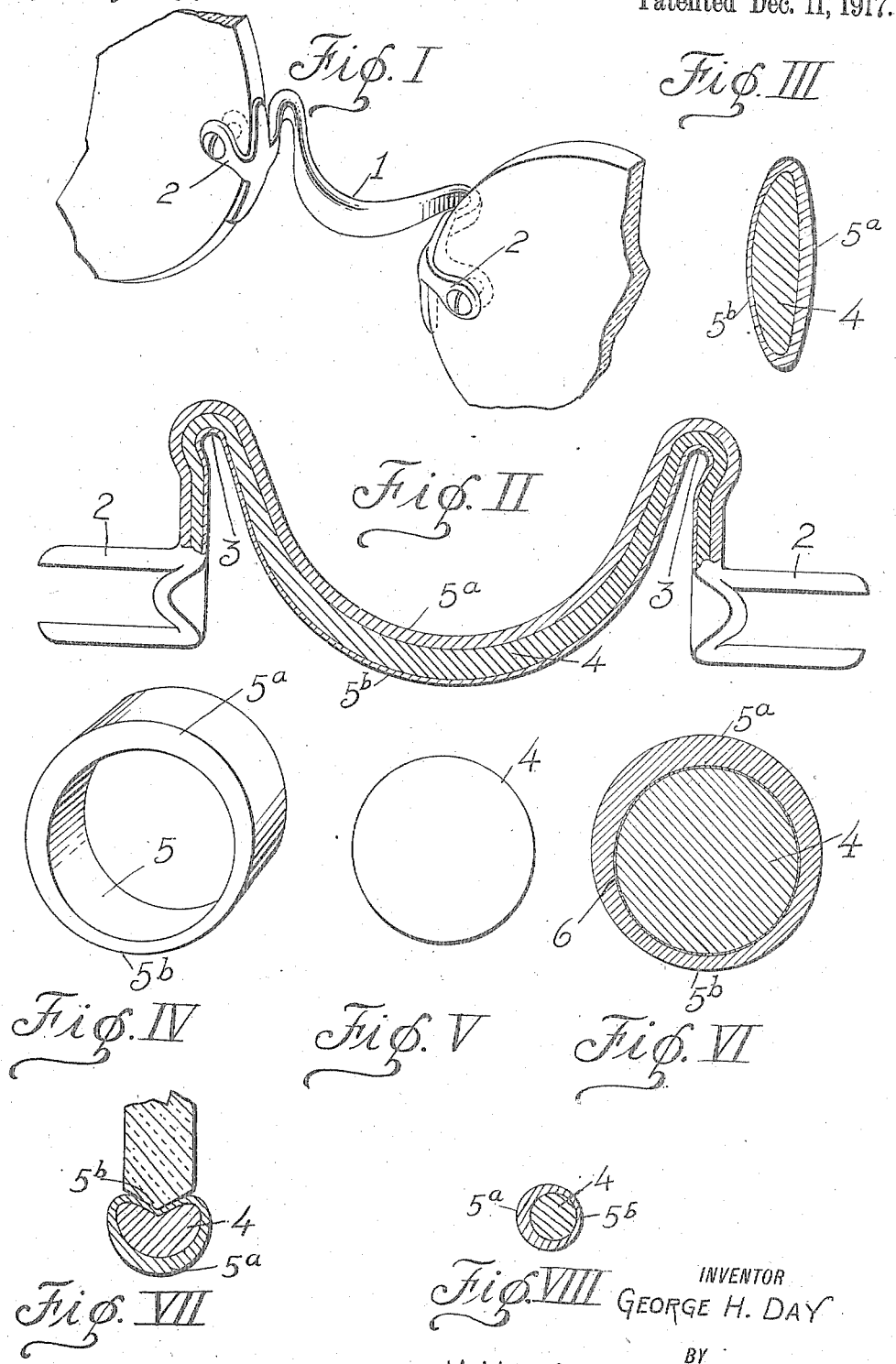

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

SPECTACLE-BRIDGE.

1,249,907.   Specification of Letters Patent.   Patented Dec. 11, 1917.

Application filed June 8, 1916. Serial No. 102,450.

*To all whom it may concern:*

Be it known that I, GEORGE H. DAY, a citizen of the United States, residing at Southbridge, in the county of Worcester and State of Massachusetts, have invented certain new and useful Improvements in Spectacle-Bridges, of which the following is a specification.

My invention relates to improvements in spectacle bridges or the like and has particular reference to an improved method or process of forming the material for said bridges and of the production of an improved durable completed article.

A further object of my invention is the provision of a novel construction of spectacle bridge of gold-filled or similar material which shall be reinforced at those points having the greatest wear while less heavily covered at the points requiring the covering for appearance only.

A further object of my invention is the accomplishment of the foregoing results in such manner that there shall be no seams, joints or the like on the surface of the completed article.

Other objects and advantages of my improved construction should be readily apparent by reference to the following description taken in connection with the accompanying drawings, and it will be understood that I may make any modifications in the specific details of construction shown and described within the scope of the appended claims without departing from or exceeding the spirit of my invention.

Figure I represents a view of one form of completed spectacle bridge constructed in accordance with and embodying the principles of my invention.

Fig. II represents a central substantially horizontal sectional view thereof on an enlarged scale to most clearly bring out the essential features or advantages of my improvement.

Fig. III represents a sectional view on the line III—III of Fig. II.

Fig. IV represents a view of the gold shell used in the formation of the wire from which the bridge is constructed.

Fig. V represents an end view of the core.

Fig. VI represents a view of the core and shell united before being reduced.

Fig. VII represents a sectional view of a frame or eye wire constructed in accordance with this invention.

Fig. VIII represents a similar sectional view through the plain reduced wire adapted for example for a temple.

In the drawings, in which similar characters of reference are employed to denote corresponding parts throughout the several views, the numeral 1 designates as an entirety a bridge or lens connecting member for an ophthalmic mounting, it being understood that while I have here illustrated what is commonly termed in the art a saddle bridge construction, my improvement is equally applicable to a C bridge or any other form of bridge, and that it can if desired likewise be employed in connection with temples and other parts for ophthalmic mountings, although most particularly adapted for bridge constructions.

It will be noted by reference to Fig. II for example that this bridge has a central arched portion adapted to fit around the nose with reverse forwardly bent portions secured to a frame or other lens retaining member 2. It is, therefore, apparent that the greatest wear on the bridge is liable to come on the inner face of the arch where the mounting rests against and has some slight movement up and down on the nose and wear in being applied and removed, and a certain portion of wear around the bends of the bridge due to the strain of the material in the bending, the fact that these parts also have a certain engagement with the face, and that they project and receive a certain amount of wear when the mounting is laid down, placed in a case or the like. On the other hand the portion within the bends indicated by the numeral 3 is protected from practically all wear and needs the gold-filled coat simply to cover the base metal and present an attractive appearance but is not subject to any severe wear. The same can practically be said to be true of the outer face of the arch of the bridge.

It is, therefore, the primary purpose of the present invention to provide a novel and improved bridge reinforced at these points of wear and having a lighter coating at the points which are not subject to so great wear so that the entire life of the mounting will be approximately the same, and so that a greater value to the consumer may be provided for the same cost, in that in place of either a thin coating all around which would not wear long, or a thick coating all the way around, which would be expensive, a thick coating is provided at the points of wear and the thin or less expensive coating at the parts not subject to so great wear.

The manner in which this result is accomplished is believed to be most clearly brought out in Figs. IV to VI inclusive, from which it will be seen that an ordinary base metal core 4 of cylindrical form is employed in the usual manner in connection with a seamless shell 5 of gold. This gold shell, however, as is brought out in Figs. IV and VI in place of being of the usual even tubular form is constructed with a bore of size to just admit the core 4 but so arranged that the core 4 will be located eccentric to the axis of the gold shell, this result being accomplished by forming the gold shell relatively thick on one side as at 5$^a$, and relatively thin on the opposite side as at 5$^b$. The gold shell having been so formed the core 4 is placed in it and suitably secured as by the solder or uniting medium 6, as indicated in Fig. VI, and the stock then reduced from the heavy bar to the wire illustrated in Fig. III, the wire here being shown as slightly oval in form for purposes of construction of a bridge member such as shown in Fig. I, the reduction having been equal on the bar so that in its final form the wire has the heavy portion 5$^a$ on one side of it and the thinner portion 5$^b$ on the opposite side surrounding the base metal core 4. It is then merely necessary to bend the bridge to complete any desired final shaping of the wire and bend it into shape when the bridge will have the heavy or reinforced portion 5$^a$ on the inner side and the lighter portion 5$^b$ on the outer side.

I claim:

1. A spectacle bridge comprising a base metal core and a seamless gold shell thereon, said shell having a reinforced portion of uniform thickness disposed on the inner face of the bridge and having a portion of gradually decreasing thickness extending from the inner to the outer face of the bridge.

2. A wire for the manufacture of ophthalmic mountings or the like, comprising an inner base metal core and an outer seamless precious metal shell suitably connected, the inner wall of the shell and outer wall of the core being concentrically arranged and the outer wall of the shell being eccentric to the core whereby a thicker portion is provided at one side of the wall, substantially as and for the purpose described.

3. As a new article of manufacture, a bridge member for an ophthalmic mounting, comprising two parts, an inner core member and a seamless incasing shell therefor, the said shell being initially eccentrically located upon the core whereby in the finished product the bridge will possess a relatively thick precious metal shell on one side and a relatively thinner precious metal shell on the side exposed to less wear, the thickened portion being continuous for the length of the piece and the thickness of the shell at various points being in constant ratio to the diameter of the core, different diameters of core having different thicknesses of incasing shell therearound.

4. As a new article of manufacture, a reinforced fitting for an ophthalmic mounting, comprising a base metal core member incased in a continuous precious metal shell which throughout the entire length of the member has a thick wall on one side of the core and a thinner wall at the diametrically opposite side of the core.

5. A fitting of filled material having a seamless shell thicker on one side than on the other throughout the length of the fitting.

In testimony whereof I affix my signature in the presence of two witnesses.

GEORGE H. DAY.

Witnesses:
H. K. PARSONS,
JOSEPH J. DEMERS.

Copies of this patent may be obtained for five cents each, by addressing the "Commissioner of Patents, Washington, D. C."